United States Patent [19]

Grass et al.

[11] 4,181,354
[45] Jan. 1, 1980

[54] VEHICLE SEAT

[75] Inventors: Gerd Grass, Detmold; Jörg Hettich, Lemgo, both of Fed. Rep. of Germany

[73] Assignee: Gebr. Isringhausen, Lemgo, Fed. Rep. of Germany

[21] Appl. No.: 874,338

[22] Filed: Feb. 1, 1978

[30] Foreign Application Priority Data

Feb. 7, 1977 [DE] Fed. Rep. of Germany ....... 2704919

[51] Int. Cl.$^2$ .............................................. A47C 3/00
[52] U.S. Cl. .................................... 297/307; 248/564
[58] Field of Search ............... 248/157, 399, 400, 421, 248/423; 297/307–309, 345; 108/117, 145

[56] References Cited

U.S. PATENT DOCUMENTS

| | | | |
|---|---|---|---|
| 2,562,041 | 7/1951 | Keller et al. | 297/307 |
| 3,163,466 | 12/1964 | Badke et al. | 297/307 |
| 3,572,828 | 3/1971 | Lehner | 248/399 X |
| 3,761,045 | 9/1973 | Sturhan | 248/399 |
| 3,888,451 | 6/1975 | Lacey | 248/399 |

*Primary Examiner*—James C. Mitchell
*Attorney, Agent, or Firm*—Salter & Michaelson

[57] ABSTRACT

A resiliently-mounted vehicle seat has a spring unit on the linkage between the seat frame and the underframe. The unit is interposed between the linkage and the seat frame and includes springs which extend between an extension of the linkage and the seat frame. The springs are connected to a bar which engages the extension at an adjustable position along its length to vary the restoring force of the springs on the linkage according to the weight of the occupant.

Movement of the bar along the extension is controlled by virtue of a selective gripping action of the bar on the extension so that in the unloaded condition of the seat the bar does not grip the extension.

As an additional feature a mechanism is provided for selecting the desired position of the bar on the extension when the seat is occupied, the bar moving when vibrations in the seat unload the unit.

5 Claims, 3 Drawing Figures

VEHICLE SEAT

This invention relates to resiliently mounted vehicle seats of the kind in which a seat frame which carries the seat cushion is supported on an underframe by means of linkages arranged at the sides of the frames.

A spring and damping unit including tension springs and a shock absorber may be incorporated into the support, one end of the spring and damping unit engaging an extension piece of the linkage, the extension piece being engageable with a transverse bar that is mounted in bearings for movement along a guide edge of the extension piece in order to change the restoring moment exerted on the levers by the springs as described in more detail in our pending application Ser. No. 874,337.

The movement of the spring and damping unit along the guide edge of the extension piece requires a large amount of force particularly when the seat is occupied and the extension piece is inclined relative to the force of the spring and damping unit. In addition it is disadvantageous that the point of engagement of the transverse bar with the guide edge is fixed in the position set at any given time since an undesired displacement of the point of engagement of the spring and damping unit may take place during vibration of the vehicle seat.

An object of the invention is to design a device for the movement and fixing of the point of engagement of the transverse bar along the guiding edge of the extension piece.

According to the invention a resiliently-mounted vehicle seat comprises a seat frame; a seat cushion carried by the seat frame; an underframe; a linkage at each side of the underframe supporting the seat frame from the underframe, at least one of the linkages having an extension piece on one of the links and the extension piece defining a guide edge; a spring and damping unit including tension springs, the unit being interposed between the linkage and the seat; a shaft to which one end of each spring is pivotally attached, the guide edge being in the form of an arc the axis of the radius of curvature of which is defined by said shaft; a bar located against the guide edge and extending at a right angle to said edge for movement along said edge, the springs being arranged at either side of the extension piece to pull the bar against the guide edge, the bar including parts hinged together and defining a clamping groove between the parts in which the guide edge is received, the parts being movable in pincer-like manner to grip the extension piece; and stop yokes located at the outer sides of the springs and arranged to pivot about said shaft and to be engageable with the outer ends of the bar, the stop yokes having an effective length somewhat greater than the radius of curvature of the guide edge in the unloaded condition of the seat; whereby the bar can move along the guide edge in an unloaded condition of the seat while in the loaded condition the bar grips the extension piece to determine the point of application of the springs on the extension piece and thereby the moment exerted on the linkage by the springs.

Movement of the bar along the guide edge normally takes place in the unloaded state of the seat. The extension piece is then moved up to the end stop and the guide edge describes a circular arc about the shaft provided at the opposite end of the spring and damping unit. Since the stop yokes are also arrranged to pivot on this shaft, and the yokes hold the bar somewhat away from the guide edge in the unloaded state, the displacement of the bar along the guide edge can easily be carried out substantially without friction since in the unloaded condition the bar is only engaged with the stop yokes and is relatively free.

Even an insignificant loading of the seat is sufficient to move the extension piece forward against the bar so that the ends of the bar are lifted off the stop yokes and as a result the clamping groove engages the edge in a pincer-like manner to secure the bar against relative movement. Any undesired movement of the point of engagement of the bar on the lever extension piece during vibration of the seat is thus impossible.

Movement of the bar and with it the point of engagement thereof along the guide edge may take place by means of a lever, a Bowden wire or the like which is attached to one of the stop yokes.

In some applications of the seat it may be desirable to change the point of engagement of the bar on the extension piece and thus the magnitude of the restoring moment exerted on the linkage by the springs without the occupant of the seat having to vacate it for this purpose. Advantageously for this purpose the movement of the bar along the guide edge takes place by means of a spring which is fixed to one of the stop yokes and which can be pre-stresed by means of a selection mechanism in the desired direction of movement, as required.

The occupant of the seat can pre-stress the spring by means of the selection mechanism at any time, the spring will then move the bar along the guide edge at a suitable moment when the seat is unloaded. Suitable moments in which the seat is unloaded occur relatively frequently during vibration of the seat on passing through the upper vibration stroke so that the preselected position of the bar will be achieved a short time after setting the selection mechanism.

In one embodiment of the invention it is provided that in order to preselect the point of engagement of the bar on the extension piece an elongated sinuous spring is used which is attached at one end to the shaft and which is connected to one of the stop yokes at a point spaced from the shaft by means of a pin or the like. The other end of the sinuous spring is connected by means of a rod to a self-locking rack and pinion gear operated by means of a hand wheel, which may be fitted towards the front at the side of the seat. By operating the hand wheel in the desired direction of rotation the sinuous spring is stressed and displaces the bar, and accordingly the point of engagement of the bar on the linkage extension piece, at a suitable moment.

An embodiment of the invention will now be described by way of example with reference to the drawings, in which.

Figure 1:
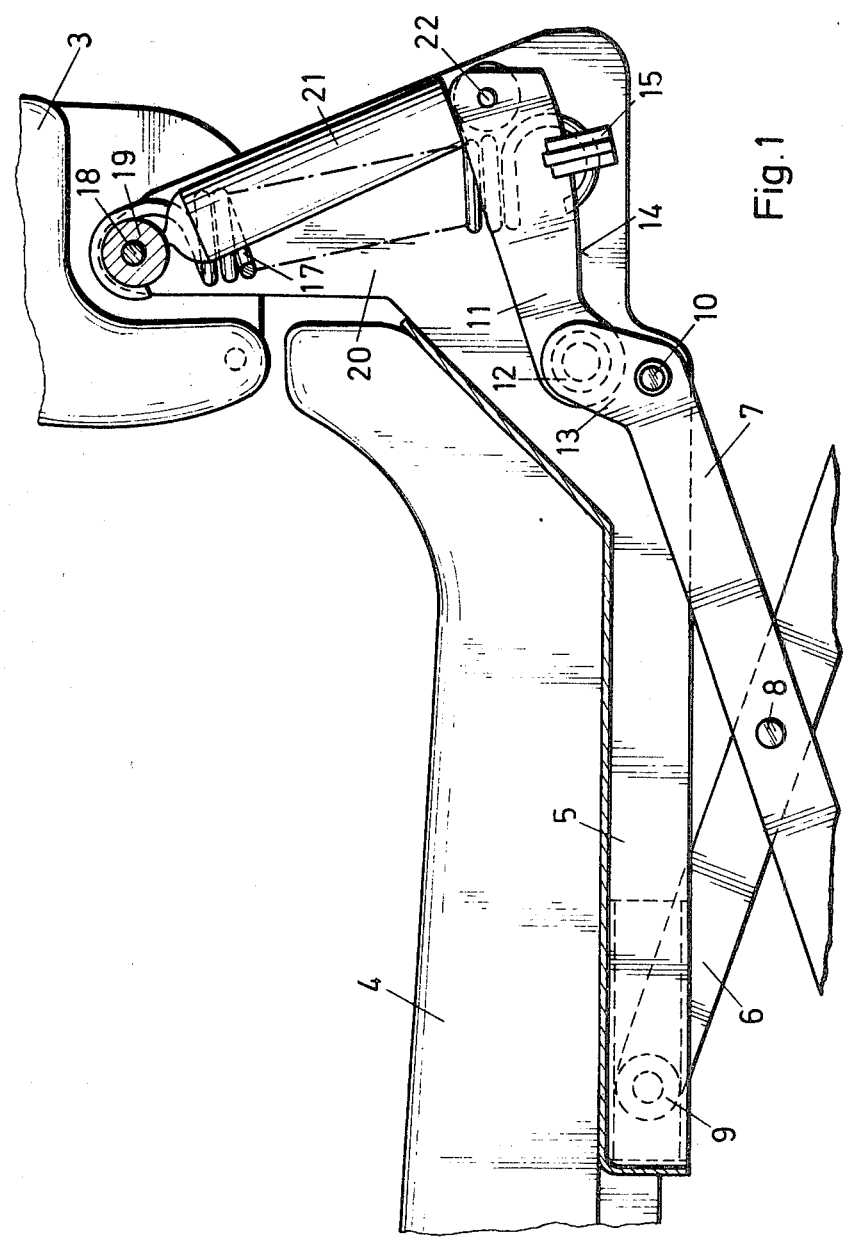
FIG. 1 is the side view of a vehicle seat according to the invention.

Referring to the drawings the vehicle seat of FIG. 1 includes a back rest 3 and a seat cushion 4 which is mounted on a seat frame 5. The seat frame is supported on an underframe (not shown), suited to the construction of the particular vehicle, by a scissors linkage including links 6 and 7, one linkage being arranged on each side of the seat and the links being joined together at their points of intersection by pivot pins 8. The upper ends of the links 6 are provided with rollers 9 which are each mounted in bearings in channel-section parts of the seat frame 5. At its upper end each link 7 pivots relative to the seat frame 5 by means of a pivot pin 10.

Figure 2:
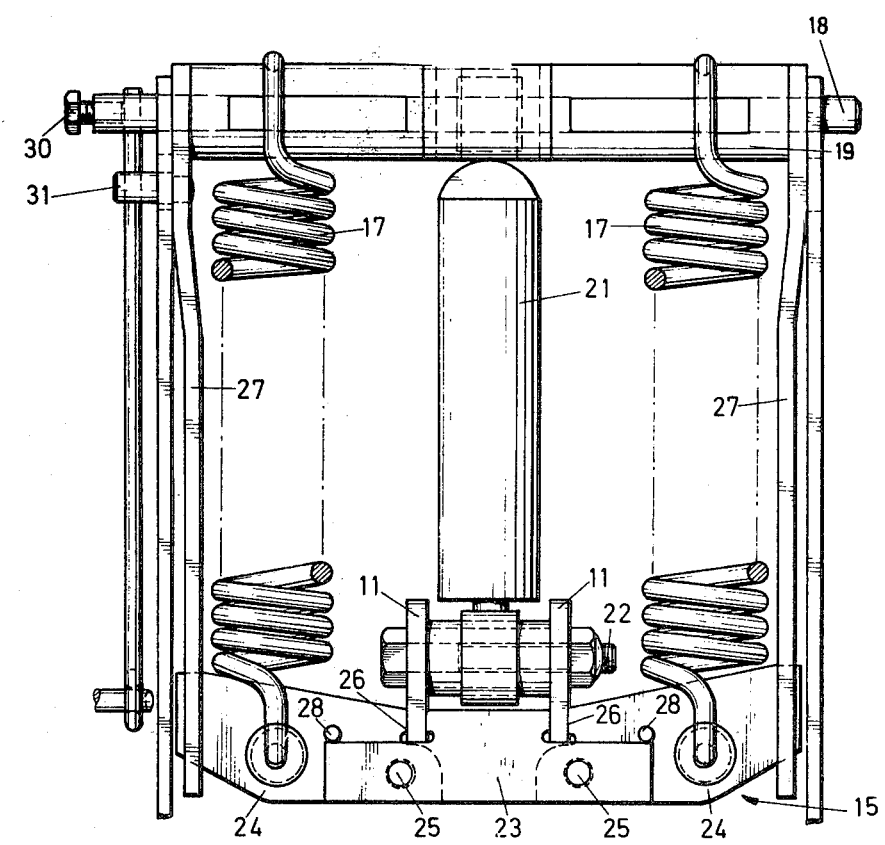
FIG. 2 is a plan view from the rear of the spring and damping unit of the vehicle seat of FIG. 1.

The links 7 are extended outward beyond the pins 10 by means of rearwardly-extending extension pieces 11. In the illustrated embodiment there are two extension pieces 11 arranged parallel to each other (FIG. 2) which are welded together onto a tube 12. The tube 12 connects the extension pieces 11, arranged approximately centrally of the seat, rigidly to extension pieces 13 of the links 7.

The extension pieces 11 are formed on their undersides with a guide edge 14 or surface. A transverse bar 15 is mounted to move in bearings on this guide edge and is pulled against the guide edge 14 by tension springs 17.

The upper ends of the tension springs 17 are attached to an upper shaft 18 by means of rotatable sleeves 19. The shaft 18 is mounted in bearings in upward extended sides 20 of the seat frame 5. The shaft 18 serves at the same time to pivotally support a shock absorber 21 which at its lower end is connected pivotably to the extension piece 11 by means of a bolt 22 and this connection at the same time serves to fix the position of the linkage extension piece 11 at their outer ends.

The bar 15 extends at a right angle to the guiding edge 14 of the extension piece 11 and has a central section 23 and two end sections 24. The end sections are hingedly attached, in each case, to the central section by a pivot 25 in such a way that clamping grooves 26 are formed in the transverse bar 15, the grooves surrounding the guiding edges 14 of the linkage extension pieces 11 in the form of pincers.

The force of the tension springs 17 causes the clamping grooves 26 of the transverse bar 15 to clamp the extension pieces 11 and thus prevent movement of the transverse bar along the guiding edges 14. However, in the unloaded state of the seat the extension pieces 11 are urged by the springs 17 to locate the outermost ends of the transverse bar 15 in engagement with the stop yokes 27 which are also pivotally mounted in bearings located on the upper shaft 18. In this condition the force of the tension springs 17 in conjunction with the action of stop pins 28 causes the clamping grooves 26 of the transverse bar 15 to open and the transverse bar as a whole to lift somewhat away from the guiding edges 14 of the extension pieces 11. In order to displace the transverse bar along the guiding edge it is then only necessary to overcome the negligible forces of friction which arise from the suspension of the stop yokes 27 from the shaft 18. The stop yokes 27 have an effective length somewhat greater than the radii of curvature of the guide edges in the unloaded condition of the seat.

Figure 3:
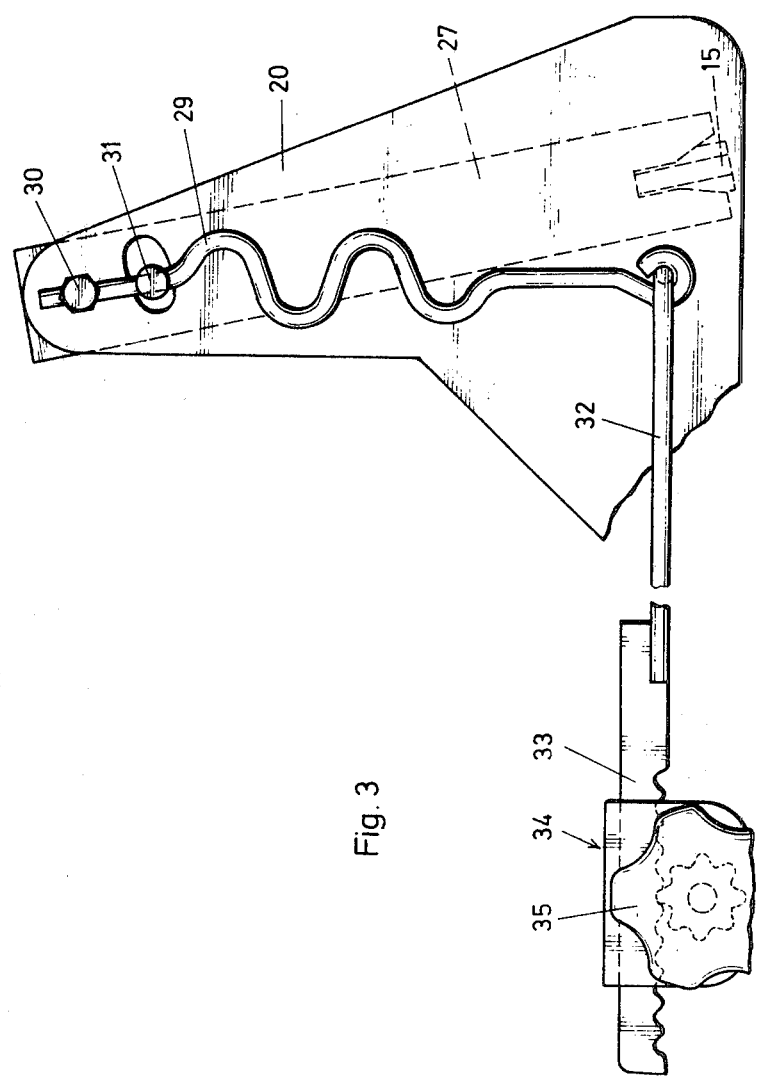
FIG. 3 is a side view of a device for selecting the magnitude of the restoring force on the vehicle seat in accordance with the weight on the seat.

FIG. 3 shows a selection mechanism by means of which the desired position of displacement of the transverse bar 15 along the guide edge 14 of the extension pieces 11 can be preselected and includes a sinuous spring 29. The upper end of the sinuous spring 29 is fastened in a hole in the shaft 18 by a counter nut 30. Somewhat below the shaft 18 a carrier pin 31 is attached to the sinuous spring 29 and projects through an oblong hole in the side wall 20 of the seat frame and is fixed to one of the stop yokes 27.

The lower end of the sinuous spring 29 is connected by a rod 32 to a gear rack 33 which can be moved longitudinally in either direction by means of a self-locking gear unit 34. The gear unit 34 may, for example, be located adjacent to the front and at the side of the seat frame, so that a hand wheel 35 for operating the gear unit can be grasped easily by the occupant of the seat.

By means of the hand wheel 35 the sinuous spring 29 can be easily prestressed relative to the position of the stop yoke 27 and thus relative to the position of the transverse bar 15 in one direction or the other so that at any moment in which the seat is in an unloaded state, the transverse bar 15 can be displaced relative to the guiding edges 14 of the extension pieces 11 for location in a preselected position.

What we claim as our invention and desire to secure by Letters Patent of the United States is:

1. A resiliently-mounted vehicle seat, comprising a seat frame; a seat cushion carried by said seat frame, an underframe connected to said seat frame; a linkage at each side of the underframe supporting the seat from the underframe, at least one of said linkages including an extension piece joined thereto which has a guide edge formed thereon; a spring and damping unit including tension springs interposed between said linkages and said seat, a shaft to which one end of each spring is pivotally connected, said guide edge as formed on an extension piece being in the form of an arc, the axis of the radius of curvature of which is defined by said shaft, a bar engaging said guide edge and extending transversely of said guide edge for movement therealong, said springs being located on both sides of the extension piece and engaging said bar for urging said bar against said guide edge, said bar including hinged sections that define a clamping groove therebetween and in which said guide edge is received, said hinged sections being movable in a pincer-like manner upon application of a load to said seat frame to grip the extension piece, and stop yokes located at the outer sides of said springs and being pivotal about said shaft for engagement with the outer ends of said bar, said stop yokes having an effective length somewhat greater than the radius of curvature of said guide edge and the unloaded condition of the seat frame, wherein said bar is movable along said guide edge in an unloaded condition of said seat frame, while in the loaded condition of said seat frame, said bar grips the extension piece to determine the point of application of said springs on the extension piece and the moment exerted on the linkage by said springs.

2. A vehicle seat according to claim 1, each of said linkages having an extension piece, said pieces being located in parallel relation with respect to one another, and each piece being formed with an arcuate shaped guide edge.

3. A vehicle seat according to claim 1, lever means including stop yokes engaging said bar for moving said bar along said guide edge in an unloaded condition of said seat frame.

4. A vehicle seat according to claim 3, a further spring engaging one of said stop yokes for moving said bar along said guide edge in an unloaded condition of the seat frame, a stressing device engaging said one stop yoke, wherein said further spring is prestressed in the desired direction of displacement of said bar.

5. A vehicle seat according to claim 4, one end of said further spring being attached to said shaft, said further spring also being connected to one of the stop yokes at a point spaced from said shaft, and the other end of the further spring being connected by means of a rod to a self-locking rack and pinion gear operated by a handwheel, said further spring in its unloaded condition extending substantially parallel to its associated stop yoke.

* * * * *